(12) United States Patent
Seto

(10) Patent No.: US 8,531,729 B2
(45) Date of Patent: Sep. 10, 2013

(54) COLOR PROCESSING APPARATUS AND METHOD THEREOF

(75) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 12/938,167

(22) Filed: Nov. 2, 2010

(65) Prior Publication Data

US 2011/0134487 A1 Jun. 9, 2011

(30) Foreign Application Priority Data

Dec. 3, 2009 (JP) .................................. 2009-275937

(51) Int. Cl.
*H04N 1/40* (2006.01)

(52) U.S. Cl.
USPC ............ 358/3.23; 358/1.9; 358/515; 358/1.1; 382/162

(58) Field of Classification Search
USPC .................. 358/1.1, 1.9, 515, 3.23; 382/162
See application file for complete search history.

(56) References Cited

U.S. PATENT DOCUMENTS

| | | | |
|---|---|---|---|
| 7,016,530 B2 | 3/2006 | Saito et al. | |
| 7,369,272 B2 | 5/2008 | Ito et al. | |
| 7,869,096 B2 * | 1/2011 | Saito | 358/3.23 |
| 8,331,661 B2 * | 12/2012 | Imai | 382/162 |
| 2004/0100640 A1 * | 5/2004 | Saito | 358/1.1 |
| 2007/0070464 A1 * | 3/2007 | Saito | 358/515 |
| 2009/0168084 A1 * | 7/2009 | Seto | 358/1.9 |

FOREIGN PATENT DOCUMENTS

| | | |
|---|---|---|
| JP | 2002-33930 | 1/2002 |
| JP | 2004-320625 | 11/2004 |

OTHER PUBLICATIONS

U.S. Appl. No. 12/944,222, filed Nov. 11, 2010. Applicant: Takamasa Seto.

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

Color values of output colors reproduced based on output values corresponding to input values of grid points in an input color space, which are obtained by sampling a range of the output values, are estimated. Changes between a color value estimated in correspondence with an input value of a grid point of interest and color values estimated in correspondence with input values of adjacent grid points, changes between an output value of the interest point and output values of the adjacent points, and changes between a plurality of color values estimated in correspondence with input values to the interest point in association with different light sources are evaluated. When the input value of the interest point, whose a sum of evaluation values of these evaluations is less than a threshold, is obtained, an output value corresponding to that input value is set in the interest point.

11 Claims, 11 Drawing Sheets

| R | G | B | C | M | Y | K | Lc | Lm |
|---|---|---|---|---|---|---|----|----|
| 0 | 0 | 0 | 0 | 0 | 0 | 255 | 0 | 0 |
| 0 | 0 | 32 | 30 | 45 | 0 | 150 | 0 | 0 |
| 0 | 0 | 64 | 50 | 70 | 0 | 30 | 0 | 0 |
| 0 | 0 | 96 | 70 | 80 | 0 | 5 | 0 | 0 |
| 0 | 0 | 128 | 70 | 90 | 0 | 0 | 0 | 0 |
| 0 | 0 | 160 | 70 | 80 | 0 | 0 | 0 | 0 |
| 0 | 0 | 192 | 50 | 70 | 0 | 0 | 0 | 0 |
| 0 | 0 | 224 | 30 | 45 | 0 | 0 | 0 | 0 |
| 0 | 32 | 255 | 0 | 0 | 0 | 0 | 0 | 0 |
| 0 | ... | 0 | 20 | 0 | 0 | 150 | 5 | 0 |
| ... | ... | ... | ... | ... | ... | ... | ... | ... |
| ... | ... | ... | ... | ... | ... | ... | ... | ... |
| 255 | 255 | 224 | 0 | 0 | 10 | 0 | 0 | 0 |
| 255 | 255 | 255 | 0 | 0 | 0 | 0 | 0 | 0 |

COLOR PROCESSING APPARATUS AND METHOD THEREOF

BACKGROUND OF THE INVENTION

1. Field of the Invention

The present invention relates to color processing for generating a profile for color separation, which indicates the relationship between input color values and output signal values to be output to an image forming device.

2. Description of the Related Art

Upon generation of a lookup table (LUT) for color separation, color-separated values of representative colors are manually calculated. Note that the color-separated values are equivalent to color signal values corresponding to amounts of color materials. Using a technique described in, for example, Japanese Patent Laid-Open No. 2002-033930 (patent reference 1), color-separated values of all grid points in a color space are interpolated using those of the representative colors, thus generating an LUT for color separation.

The technique of patent reference 1 performs the interpolation to obtain smooth changes of amounts of color materials, but does not consider obtaining smooth changes of reproduced colors. For this reason, linearity between an input color space such as an RGB space and an output color space such as a CMYK space cannot be maintained. When color separation processing is performed using linear interpolation such as tetrahedral interpolation, pseudo contours may be generated, and color reproduction precision may drop.

Japanese Patent Laid-Open No. 2004-320625 (patent reference 2) discloses a technique that estimates colors from amounts of color materials, and smoothes a color separation LUT so that reproduced colors of respective grid points become more uniform in a uniform color space with respect to an RGB space. However, the technique of patent reference 2 suffers the following three problems.

As the first problem, since output values of grid points are decided according to the shape of a gamut of an output device (to be referred to as an output gamut hereinafter), gray colors in highlight and shadow regions often seem different depending on the shape of the output gamut. As the second problem, color inconstancy, which causes changes of colors that one can perceive when a light source environment changes is not taken into consideration, and a color balance of low-saturation colors such as gray, tends to be disrupted. As the third problem, since the output values of grid points are smoothed to obtain uniform reproduced colors in a uniform color space such as a CIELab space, complicated color separation is required, and it is difficult to maintain continuity of changes of amounts of color materials in a low-lightness region where color mixture is heavily used and a gamut is narrow.

With the technique of patent reference 2 having the aforementioned problems, when the printer characteristics have changed, continuity of changes of amounts of color materials tends to be disrupted. As a result, in a low-lightness part including color mixtures of various color materials, the amounts of color materials do not change smoothly, and image quality deteriorations such as generation of pseudo contours and occurrence of heterogeneity of gloss that causes different colors depending on mixed states of color materials tend to occur.

SUMMARY OF THE INVENTION

In one aspect, a method of generating a profile for color separation that indicates a relationship between input color values in an input color space and output signal values to be output to an image forming device, the method comprising: estimating a color value of an output color reproduced by an output signal value, wherein the output signal value is obtained by sampling a range of the output signal value and corresponds to an input color value of a grid point in the input color space; calculating a first evaluation value of change between a color value estimated to an input color value of a grid point of interest in the input color space by the estimator and color values estimated to input color values of grid points adjacent to the grid point of interest by the estimator; calculating a second evaluation value of change between an output signal value of the grid point of interest and output signal values of the adjacent grid points; calculating a third evaluation value of change between a plurality of color values estimated to the input color value of the grid point of interest in a plurality of illuminants, which are different, in the estimating step; determining whether or not a sum of the first to third evaluation values becomes less than a predetermined threshold value by changing the input color value of the grid point of interest; and setting the output signal value, which reproduces the estimated color value of the grid point of interest, to the grid point of interest when the input color value of the grid point of interest that the sum becomes less than the predetermined threshold value is obtained.

According to the aspect, a profile for color separation, which suppresses a problem in which gray colors in highlight and shadow regions seem different depending on the shape of an output gamut, can be generated.

Also, a profile for color separation which suppresses any color imbalance caused by color inconstancy can be generated.

Furthermore, a profile for color separation which suppresses generation of any pseudo contours and heterogeneity of gloss in a low-lightness part can be generated.

Further features of the present invention will become apparent from the following description of exemplary embodiments with reference to the attached drawings.

DESCRIPTION OF THE EMBODIMENTS

Color processing according to an embodiment of the present invention will be described in detail hereinafter with reference to the drawings. An example of causing a computer to function as a color processing apparatus by running an application program for generating a profile for color separation (to be referred to as a color separation profile hereinafter) for an image forming device on the computer will be described below.

First Embodiment

[Apparatus Arrangement]

Figure 1:
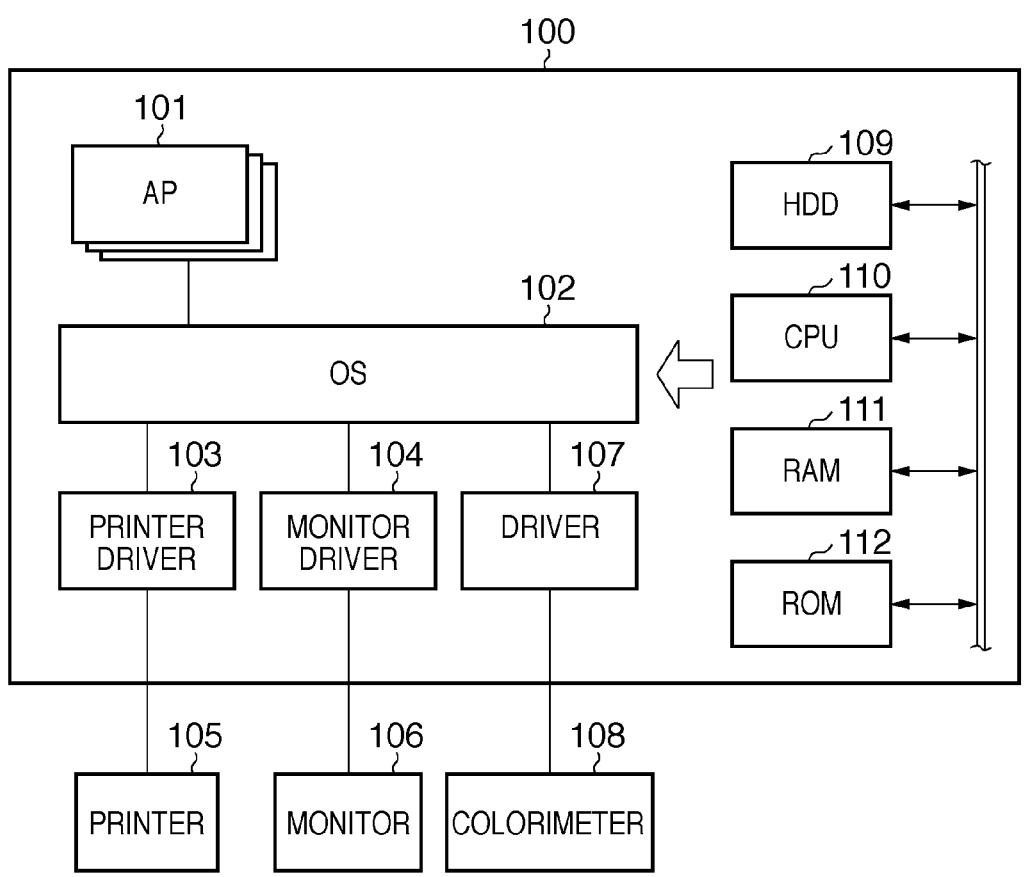
FIG. 1 is a block diagram for explaining the arrangement of a color processing apparatus according to an embodiment.

The arrangement of a color separation apparatus according to an embodiment will be described below using the block diagram shown in FIG. 1.

A microprocessor (CPU) 110 of a computer 100 executes programs stored in a read-only memory (ROM) 112 and hard disk drive (HDD) 109 using a random access memory (RAM) 111 as a work memory. These programs include an operating system (OS) 102, various application programs (AP) 101, and various driver programs. The left side of FIG. 1 shows the functional arrangement implemented by the OS 102 and AP 101.

The AP 101 displays a user interface (UI) on a monitor 106 via the OS 102 and a monitor driver 104. For example, when the user who operates the UI inputs a print instruction, the AP 101 issues a print request to the OS 102. Upon reception of the print request, the OS 102 receives data to be printed from the AP 101, and issues a print command and rendering command group to a printer driver 103 corresponding to a printer 105. Upon reception of the print command, the printer driver 103 receives the rendering command group from the OS 102, generates print data that the printer 105 can process, and outputs the print data to the printer 105.

More specifically, the printer driver 103 sequentially applies image correction processing to the rendering commands input from the OS 102, and rasterizes an image on, for example, a page memory of RGB 24 bits. Then, after all the rendering commands are rasterized, image data on the page memory is color-separated into a data format that the printer 105 can process, for example, CMKYLcLm data corresponding to respective color materials, thus outputting, for example, the CMKYLcLm data to the printer 105.

For example, when the user who operates the UI inputs a colorimetry instruction, the AP 101 issues a colorimetry request to the OS 102. Upon reception of the colorimetry request, the OS 102 issues a colorimetry command to a driver 107 corresponding to a colorimeter 108. Upon reception of the colorimetry command, the driver 107 controls the colorimeter 108 to measure colors of patches printed on, for example, a color chart, and to acquire their colorimetric values (for example, Lab values). The colorimetric values are stored in, for example, the RAM 111 by the OS 102 to be able to be referred to by the AP 101.

Although not shown, the computer 100 and the printer 105 and colorimeter 108 are connected via a serial bus interface such as a Universal Serial Bus (USB) interface. Also, the computer 100 and monitor 106 are connected via a video interface such as a video graphics array (VGA) or digital visual interface (DVI) interface.

[Printer Driver and Color Separation Profile Generation AP]

Figure 2:
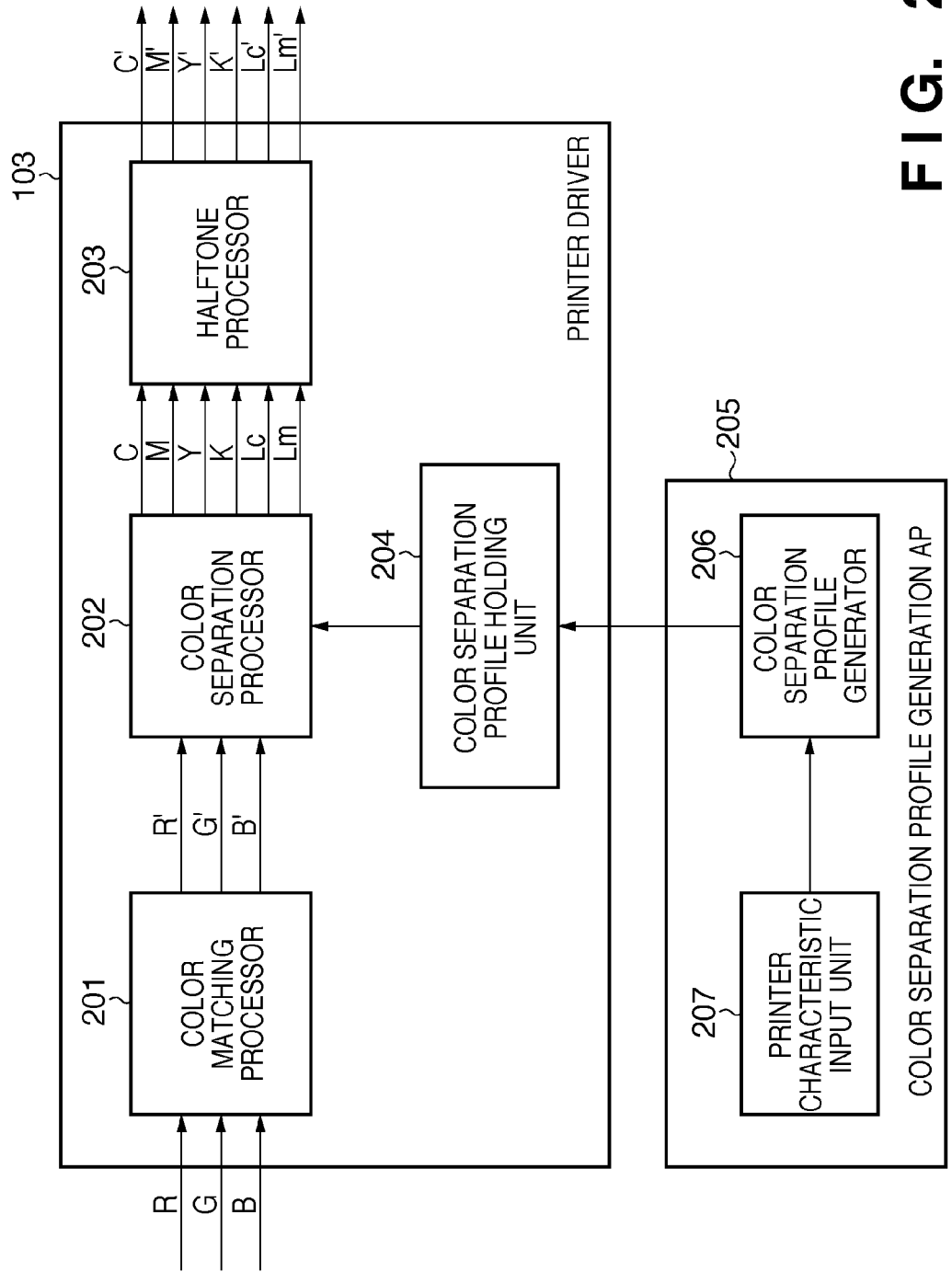
FIG. 2 is a block diagram for explaining the partial functional arrangement of a printer driver, and the functional arrangement of a color separation profile generation AP.

The partial functional arrangement of the printer driver 103 and the functional arrangement of a color separation profile generation AP 205 will be described below with reference to the block diagram shown in FIG. 2. Note that the color separation profile generation AP 205 is included in the AP 101 shown in FIG. 1.

A color matching processor 201 adjusts RGB values of input image signals so that colors which are obtained by reproducing an image expressed by rasterized image signals using the monitor 106 match those which are obtained by printing that image by the printer 105. The relationship between the RGB values and reproduced colors of the monitor 106 and that between the RGB values and printed colors of the printer 105 are described in International Color Consortium (ICC) profiles. That is, the color matching processor 201 is a color management module (CMM) which attains color conversion with reference to the ICC profiles.

A color separation processor 202 executes color separation processing for converting RGB image signals output from the color matching processor 201 into signal values corresponding to color material colors of the printer 105, for example, cyan C, magenta M, yellow Y, black K, light cyan Lc, and light magenta Lm. The color separation processor 202 executes the color separation processing with reference to a color separation profile according to print sheets used in print processing and a print mode, which profile is loaded from a color separation profile holding unit 204.

Figures 3A, 3B:
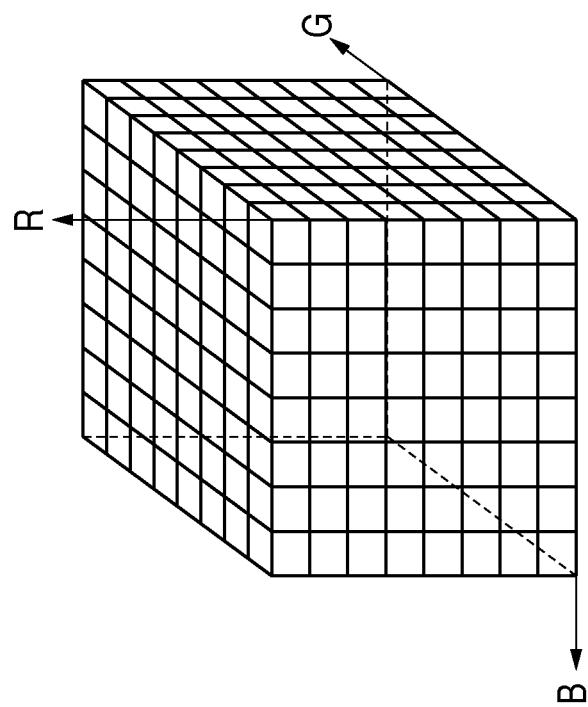
FIGS. 3A and 3B are views for explaining a color separation profile.

The color separation profile will be described below with reference to FIGS. 3A and 3B. FIG. 3A shows grid points distributed in a square grid pattern in an RGB space. An LUT, which stores signal values (output values) indicating amounts of CMYKLcLm color materials with respect to RGB values (input values) of these grid points, as shown in FIG. 3B, is the color separation profile. For example, the color separation profile stores output values indicating amounts of color materials respectively corresponding to 729 ($=9^3$) grid points obtained by slicing a range from 0 to 255 into 9 at intervals of 32 under the assumption that input RGB values are respectively 8-bit data ranging from bits 0 to 255. Note that the number of bits of input image data and the grid point intervals are arbitrary.

When R'G'B' data output from the color matching processor 201 do not correspond to any grid point of the color separation profile, the color separation processor 202 interpolates output values corresponding to the R'G'B' data using output values of surrounding grid points of the R'G'B' data. In general, this interpolation popularly uses tetrahedral interpolation, but give algorithms such as cubic interpolation may be applied.

A halftone processor 203 converts the CMYKLcLm data output from the color separation processor 202 into C'M'Y'K'Lc'Lm' data having a resolution and the number of tones that the printer 105 can process. For example, the halftone processor 203 binarizes respective signal values using a 16×16 dither matrix. Alternatively, an error diffusion method may be used. The C'M'Y'K'Lc'Lm' data obtained in this way are input to the printer 105 to print an image.

Details of the color separation profile generation AP 205 will be described later. A printer characteristic input unit 207 inputs, for example, colorimetric data of a color chart required to generate a color separation profile to a color separation profile generator 206. The color separation profile generator 206 stores a generated color separation profile in the color separation profile holding unit 204.

[Color Separation Profile Generator]

Figure 4:
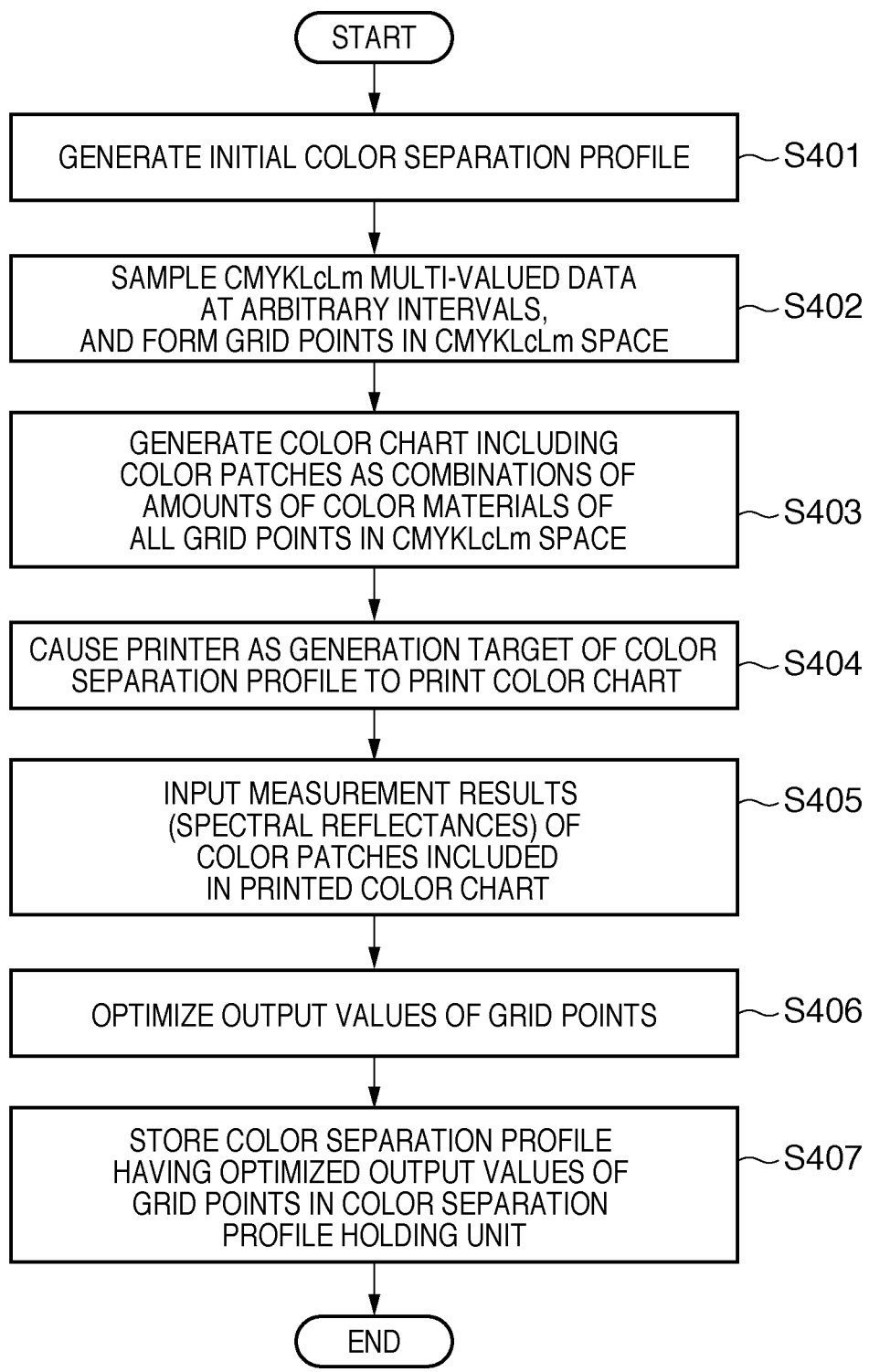
FIG. 4 is a flowchart for explaining color separation profile generation processing.

The color separation profile generation processing will be described below with reference to the flowchart shown in FIG. 4.

The color separation profile generator 206 generates an initial color separation profile (S401). As will be described in detail later, the user inputs and adjusts pieces of color information (signal values indicating amounts of color materials) of representative grid points by operating the UI displayed on the monitor 106, thus generating the initial color separation profile. Alternatively, the user may set a color separation profile having conditions (printer model, print sheets, and print mode) similar to a color separation profile to be generated as the initial color separation profile.

The initial color separation profile set by the aforementioned method has grid points which are uniformly allocated in the RGB space. However, colors corresponding to these grid points are not uniformly allocated in a uniform color space (for example, a CIELab space). Therefore, when a color separation profile generated by interpolations based on the pieces of color information of the representative grid points, which are input and adjusted by the user, is used, adverse effects such as a conversion precision drop of the color separation processor 202 and generation of pseudo contours may occur, as described above.

The color separation profile generator 206 measures spectral reflectances of colors printed by a printer as a generation target of a color separation profile based on output values of grid points of the color separation profile generated by interpolations from pieces of color information of the representative grid points, which are input and adjusted by the user. Then, the color separation profile generator 206 evaluates the correspondence relationship between the output values of the grid points and the measured spectral reflectances, thereby optimizing the output values of the grid points. This correspondence relationship can be acquired as follows using a cellular Yule-Nielsen spectral Neugebauer model.

The color separation profile generator 206 samples a range of CMYKLcLm multi-valued data at arbitrary intervals to form grid points in a CMYKLcLm space (cell division) (S402). Then, the color separation profile generator 206 generates a color chart including color patches as combinations of amounts of color materials of all the grid points in the CMYKLcLm space (S403). The color separation profile generator 206 outputs the color chart to the halftone processor 203 while setting the color separation processor 202 in a through-pass state, and controls a printer as a generation target of a color separation profile (the printer 105 in this example) to print the color chart (S404). The printer characteristic input unit 207 controls the colorimeter 108 via the driver 107 to input colorimetry results (spectral reflectances) of the color patches included in the printed color chart (S405).

The color separation profile generator 206 calculates, by linear interpolation, spectral reflectances for output values of the grid points of the color separation profile, which do not correspond to the grid points in a color material amount space, from the spectral reflectances of the grid points which surround the combinations of amounts of color materials (spectral Neugebauer model). In this case, the estimation precision can be improved in consideration of nonlinearity due to dot gains using the Yule-Nielsen model. Then, the color separation profile generator 206 optimizes the output values of the respective grid points based on the correspondence relationship between the output values of the grid points of the color separation profile and the spectral reflectances, which relationship is acquired from the measured spectral reflectances and those which are calculated by linear interpolation (S406). Note that details of the processing for optimizing the output values of the grid points will be described later.

Note that the method of acquiring the correspondence relationship between the output values (amounts of color materials) and the spectral reflectances is not limited to the cellular Yule-Nielsen spectral Neugebauer model. Any other methods may be used as long as they can acquire the correspondence relationship between the output values and the spectral reflectances.

The color separation profile generator 206 stores the color separation profile including the output values of the grid points which are optimized in step S406 in the color separation profile holding unit 204 (S407), thus ending the processing.

Generation of Initial Color Separation Profile (S401)

Figure 5:
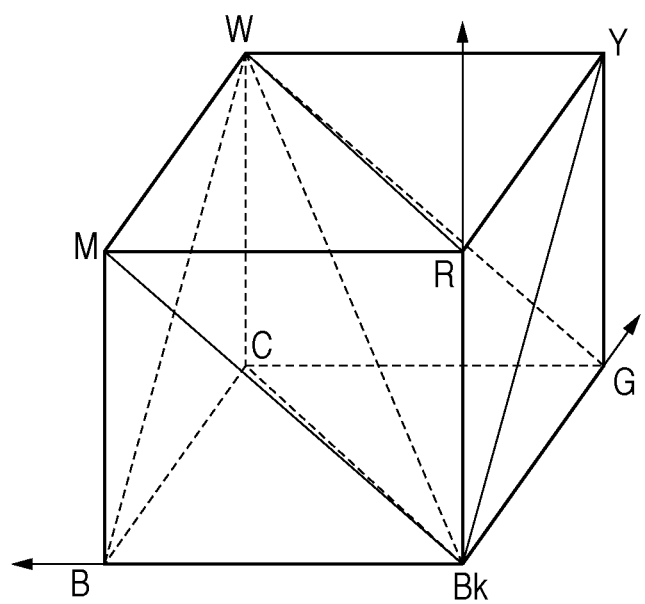
FIG. 5 is a view for explaining an RGB space as a color space of input image signals.

The RGB space as a color space of input image signals will be described below with reference to FIG. 5. Upon generation of the initial color separation profile, amounts of color materials of eight grid points C, M, Y, R, G, B, W, and Bk as vertices of the RGB space shown in FIG. 5 are initially set. Note that coordinates (R, G, B) of the grid points of these vertices are as follows.

C=(0, 255, 255): cyan primary color,
M=(255, 0, 255): magenta primary color,
Y=(255, 255, 0): yellow primary color,
R=(255, 0, 0): red primary color,
G=(0, 255, 0): green primary color,
B=(0, 0, 255): blue primary color,
W=(255, 255, 255): white (corresponding to color (white point) of a print sheet), and
Bk=(0, 0, 0): black (corresponding to a darkest point of a printer).

Since W corresponds to paper white, all amounts of color materials are set to be "0".

As for Bk and process colors (primary colors) C, M, and Y, in order to prevent muddiness due to color mixture, amounts of only corresponding color materials are set to be significant, and amounts of other color materials are set to be "0". The amounts of significant color materials are set to satisfy a maximum amount (a maximum amount of applied color materials) applicable to (printable on) a print sheet according to the print sheet used in print processing and a print mode.

R, G, and B are secondary colors reproduced by color mixture. For example, as for R, using color materials corresponding to M and Y, a plurality of color patches corresponding to a plurality of combinations, in each of which a total of amounts of two color materials (a total amount of applied color materials) becomes equal to a maximum amount of applied color materials, are printed by the printer 105. Then, the user visually selects a color patch having a preferred color as R, and sets a combination of the amounts of M and Y color materials of that color patch as an amount of R color material (all amounts of color materials other than M and Y are set to be "0"). Alternatively, color patches may be measured using the colorimeter 108, and a combination of amounts of color materials of a color patch having an intermediate hue value between hues of M and Y color patches may be set as an amount of R color material. Likewise, a combination of amounts of Y and C color materials is set for G, and that of amounts of C and M color materials is set for B.

The aforementioned method of setting the amounts of color materials of the eight vertices is an example, and any other methods may be used as long as the amounts of color materials of the eight vertices can be appropriately set.

Next, amounts of color materials of grid points which are located on the following diagonal lines (to be referred to as diagonal grid points hereinafter) that couple the vertices of the RGB color space shown in FIG. 5 are set.

W-C, W-M, W-Y, W-R, W-G, W-B,
C-Bk, M-Bk, Y-Bk, R-Bk, G-Bk, B-Bk,
R-Y, Y-G, G-C, C-B, B-M, M-R, and
W-Bk.

Figure 6A:
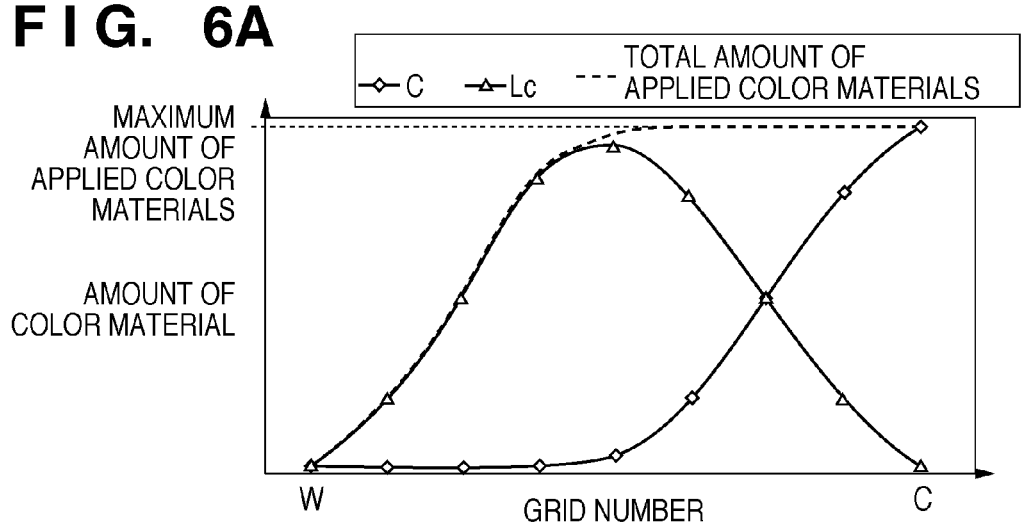
FIGS. 6A to 6C are graphs for explaining color separation of diagonal grid points.

Color separation of the diagonal grid points will be described below with reference to FIGS. 6A to 6C. FIG. 6A shows a color separation example of grid points of a primary color on a diagonal line having a vertex W as a start point. In FIG. 6A, the abscissa plots grid numbers of respective grid points between the diagonal grid points, and the ordinate plots the amounts of color materials and a total amount of applied color materials of the respective grid points. As shown in FIG. 6A, the amounts of all color materials are set to be "0" at the vertex W, light cyan Lc (or Lm) is used to eliminate graininess in a low-density range, and the amount of Lc (or Lm) color material is increased as the density increases. Then, the use rate of light cyan Lc (or Lm) is reduced from a position near an intermediate density from W to C (or W to M), and use of vivid dark cyan C (or M) is started. Then, at a vertex C (or M), the amount of C (or M) color material is set to be a maximum amount of applied color materials, and amounts of other color materials are set to be "0". Note that in color separation on the diagonal line W-Y without using any light color material, the amount of color material of yellow Y is monotonically increased from the low-density range.

Figure 6B:
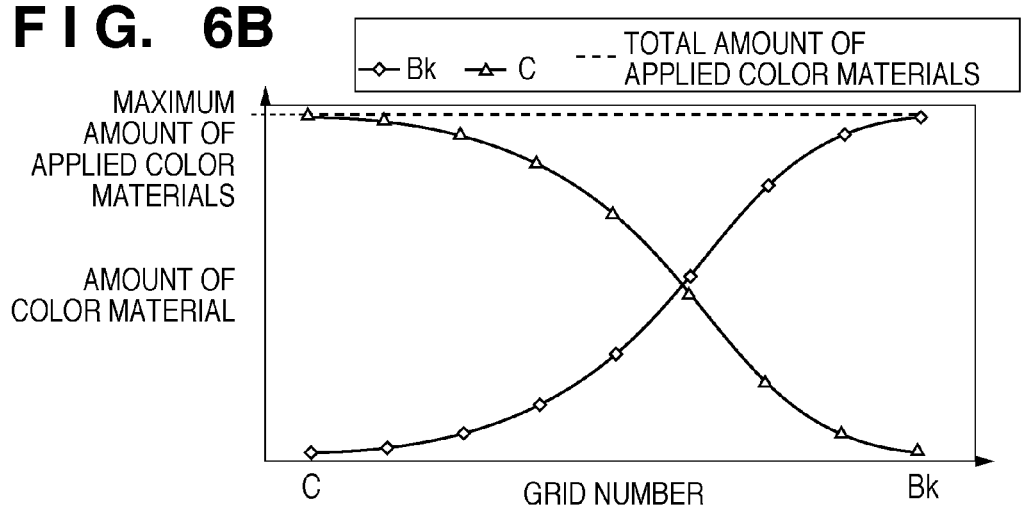

FIG. 6B shows a color separation example of grid points of a primary color on a diagonal line having a vertex Bk as a start point. In FIG. 6B, the abscissa plots grid numbers of respective grid points between the diagonal grid points, and the ordinate plots the amounts of color materials and a total amount of applied color materials of the respective grid points. As shown in FIG. 6B, at a vertex C (or M or Y), the amount of C (or M or Y) color material is set to be a maximum amount of applied color materials, and amounts of other color materials are set to be "0". The use rate of C (or M or Y) is reduced, and that of black Bk is increased as the density is increased from C to Bk (or from M or Y to Bk). At the vertex Bk, the amount of Bk color material is set to be a maximum amount of applied color materials, and amounts of other color materials are set to be "0".

Figure 6C:
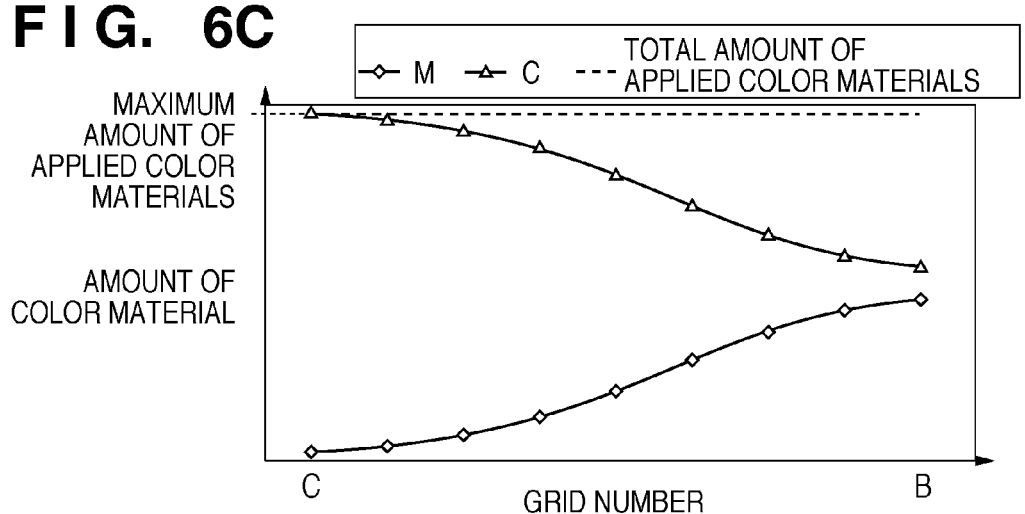

FIG. 6C shows a color separation example of grid points of a secondary color on a diagonal line that does not include the vertex W or Bk. In FIG. 6C, the abscissa plots grid numbers of respective grid points between the diagonal grid points, and the ordinate plots the amounts of color materials and a total amount of applied color materials of the respective grid points. As shown in FIG. 6C, at a vertex C, the amount of C color material is set to be a maximum amount of applied color materials, and amounts of other color materials are set to be "0". The use rate of C is reduced, and that of dark magenta M is increased as the grid position moves from C to B. At a vertex B, amounts of C and M color materials calculated from a color patch are set, and amounts of other color materials are set to be "0". Note that the same applies to color separation of grid points of other secondary colors on diagonal lines that do not include the vertex W or Bk.

FIGS. 6A to 6C do not show any color separation example of grid points on a diagonal line that couples the vertex W or Bk and the vertex of a secondary color. However, from the vertex of the secondary color toward the vertex W, the total amount of two applied color materials can be reduced while maintaining the use rates of the two color materials at the vertex of the secondary color shown in FIG. 6C. Also, from the vertex of the secondary color toward the vertex Bk, the total amount of two applied color materials can be reduced, and the amount of Bk color material can be increased while maintaining the use rates of the two color materials at the vertex of the secondary color shown in FIG. 6C, so as not to exceed a maximum amount of applied color amounts.

The color separation profile generator 206 displays the graphs shown in FIGS. 6A to 6C on the monitor 106, and prompts the user to manually adjust the amounts of respective color materials for respective grid points, thereby deciding the color separation characteristics. Furthermore, the color separation profile generator 206 may print color patches according to the adjustment result using the printer 105, and the user may visually confirm the graininess and colors of the printed color patches to further finely adjust the color separation characteristics.

In this manner, after the amounts of color materials of the vertex grid points and diagonal grid points are set, the color separation profile generator 206 decides amounts of color materials of grid points other than these grid points using, for example, a method disclosed in Japanese Patent Laid-Open No. 2002-033930. This method divides the RGB space into six tetrahedrons WRYBk, WYGBk, WGCBk, WGBBk, WBMBk, and WMRBk including W and Bk, and calculates the amounts of color materials of grid points in the respective tetrahedrons by interpolation processing. That is, the amounts of color materials of grid points of respective sides of four triangles included in each tetrahedron are decided. Hence, contour lines of amounts of color materials for respective color materials are drawn from the amounts of color materials of grid points of the respective sides, and the amounts of color materials of grid points whose amounts of color materials are not decided are interpolated based on the contour lines.

The aforementioned method of setting the color separation characteristics is an example, and any other methods may be used as long as an appropriate color separation result can be obtained.

Optimization of Output Values of Grid Points (S406)

Figure 7:
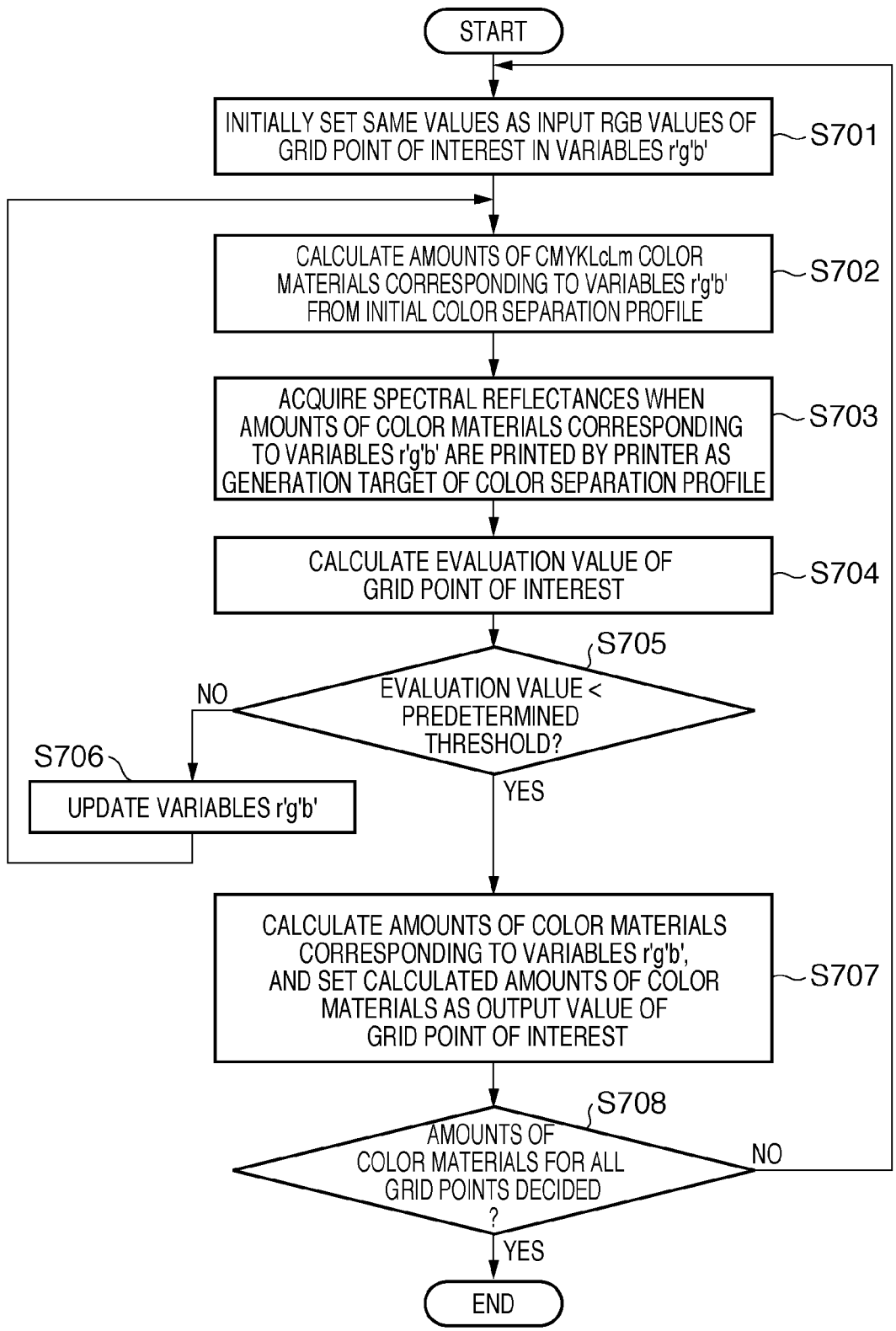
FIG. 7 is a flowchart for explaining details of processing for optimizing output values of grid points of a color separation profile.

Details of the processing (S406) for optimizing the output values of the grid points of the color separation profile will be described below with reference to the flowchart shown in FIG. 7.

The color separation profile generator 206 initially sets the same values as input values RGB of a grid point of interest in variables r'g'b' (S701). Then, the color separation profile generator 206 calculates amounts of CMYKLcLm color materials corresponding to the variables r'g'b' from the initial color separation profile using, for example, tetrahedral interpolation (S702). The color separation profile generator 206 acquires spectral reflectances when the amounts of color materials corresponding to the variables r'g'b' are printed using a printer as a generation target of a color separation profile (the printer 105 in this example) (S703). That is, the color separation profile generator 206 acquires the correspondence relationship between the output values and spectral reflectances by interpolating spectral reflectance of color patches printed based on the amounts of color materials corresponding to variables r'g'b' using the colorimetry results acquired in step S402 and the cellular Yule-Nielsen spectral Neugebauer model.

The color separation profile generator 206 calculates an evaluation value of the grid point of interest (S704). As will be described in detail later, the color separation profile generator 206 calculates a total evaluation value of the following three evaluation values.

Gradation evaluation value: an evaluation value of a positional relationship with output colors of adjacent grid points in the CIELab space;

Color material change amount evaluation value: an evaluation value of a positional relationship with amounts of color materials of adjacent grid points in the color material amount space; and Light source change amount evaluation value: an evaluation value of appearance differences under different light sources.

The color separation profile generator 206 then determines whether or not the evaluation value of the grid point of interest is less than a predetermined threshold (S705). If the evaluation value of the grid point of interest is less than the predetermined threshold, it indicates that the output color of the grid point of interest is optimized in the CIELab space, and the process advances to step S707. If the evaluation value of the grid point of interest is equal to or larger than the predetermined threshold, the color separation profile generator 206 updates the variables r'g'b' according to a predetermined algorithm (for example, a quasi-Newton method or damped least square method) (S706), and the process returns to step S702. Note that if it is determined in step S705 that the processes in steps S702 to S704 have been executed a predetermined number of times, it is presumed that the output color of the grid point of interest is optimized in the CIELab space, and the process advances to step S707.

After the output color of the grid point of interest is optimized in the CIELab space, the color separation profile generator 206 calculates amounts of color materials corresponding to the variables r'g'b' as in step S702, and sets the calculated amounts of color materials as the output values of the grid point of interest (S707).

Next, the color separation profile generator 206 repeats the processes in steps S701 to S708 until it is determined in step S708 that amounts of color materials are decided for all grid points. Note that by further repeating the aforementioned processes a predetermined number of times for all the grid points, the output colors of the grid points can be allocated more uniformly within the gamut of the printer 105.

In this way, by optimizing the output values of the respective grid points via the variables r'g'b', the output colors (output values) of the grid points of the color separation profile can be optimized based on the color separation characteristics set by the user. For example, the user adjusts the use method of dark and light color materials in consideration of graininess in the low-density range, but the use method of color materials is never changed in the processing for optimizing the output values (S404). Therefore, only allocations of the output colors corresponding to the grid points are optimized without impairing image quality factors such as graininess.

Note that the amounts of CMYKLcLm color materials may be directly optimized. In this case, arbitrary restraint conditions are given to maintain the use method of color materials, or processing for calculating an image quality evaluation value of, e.g., graininess, and setting a weighted sum of the image quality and gradation evaluation values as a target function is executed.

Calculation of Evaluation Value (S704)

Figure 8:
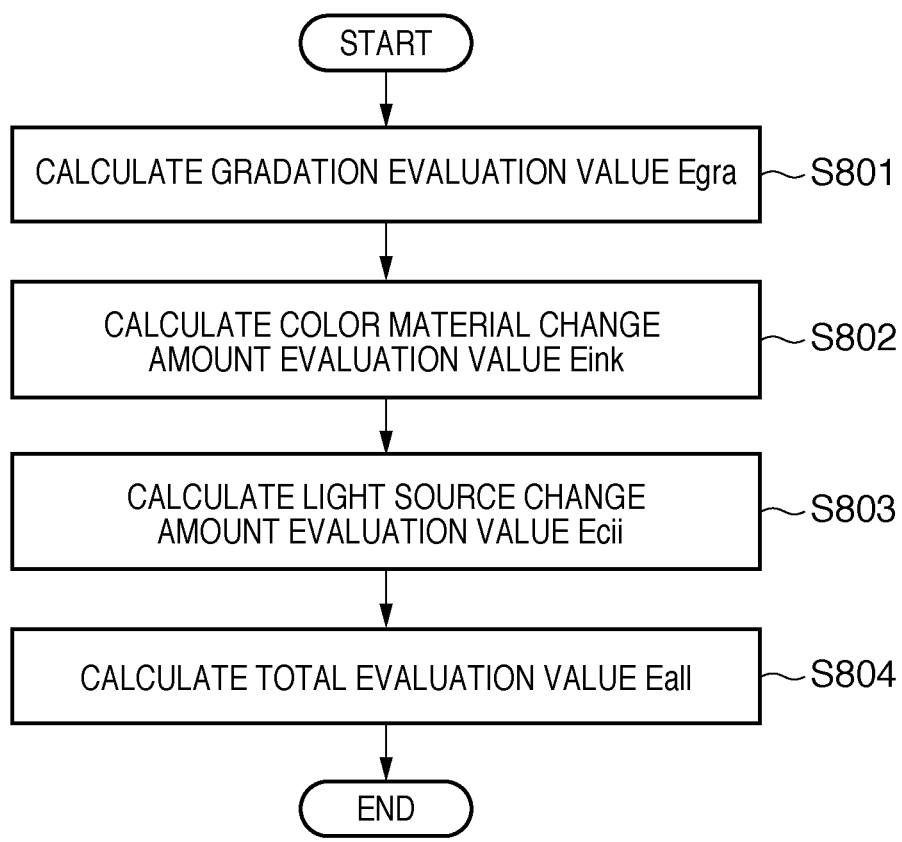
FIG. 8 is a flowchart for explaining details of processing for calculating an evaluation value of a grid point of interest.

Details of the processing for calculating the evaluation value of the grid point of interest (S704) will be described below with reference to the flowchart of FIG. 8.

The color separation profile generator 206 calculates a gradation evaluation value Egra indicating changes of output colors adjacent to the grid point of interest in association with the grid point of interest (S801). Next, the color separation profile generator 206 calculates a color material change amount evaluation value Eink indicating changes of output values of grid points adjacent to the grid point of interest in association with the grid point of interest (S802). Next, the color separation profile generator 206 calculates a light source change amount evaluation value Ecii indicating changes of output colors with respect to the grid point of interest in association with a plurality of different light sources (S803). Then, the color separation profile generator 206 calculates a total evaluation value Eall of the grid point of interest using these three evaluation values (S804) by:

$$Eall = Wgra(ri, gi, bi) \cdot Egra + \\ Wink(ri, gi, bi) \cdot Eink + \\ Wcii(ri, gi, bi) \cdot Ecii \quad (1)$$

where Wgra, Wink, and Wcii are weights for the respective evaluation values at a grid point (ri, gi, bi), and indicates the i-th grid point (corresponding to the i-th row in FIG. 3B).

Evaluation of Gradation

Figures 9A, 9B:
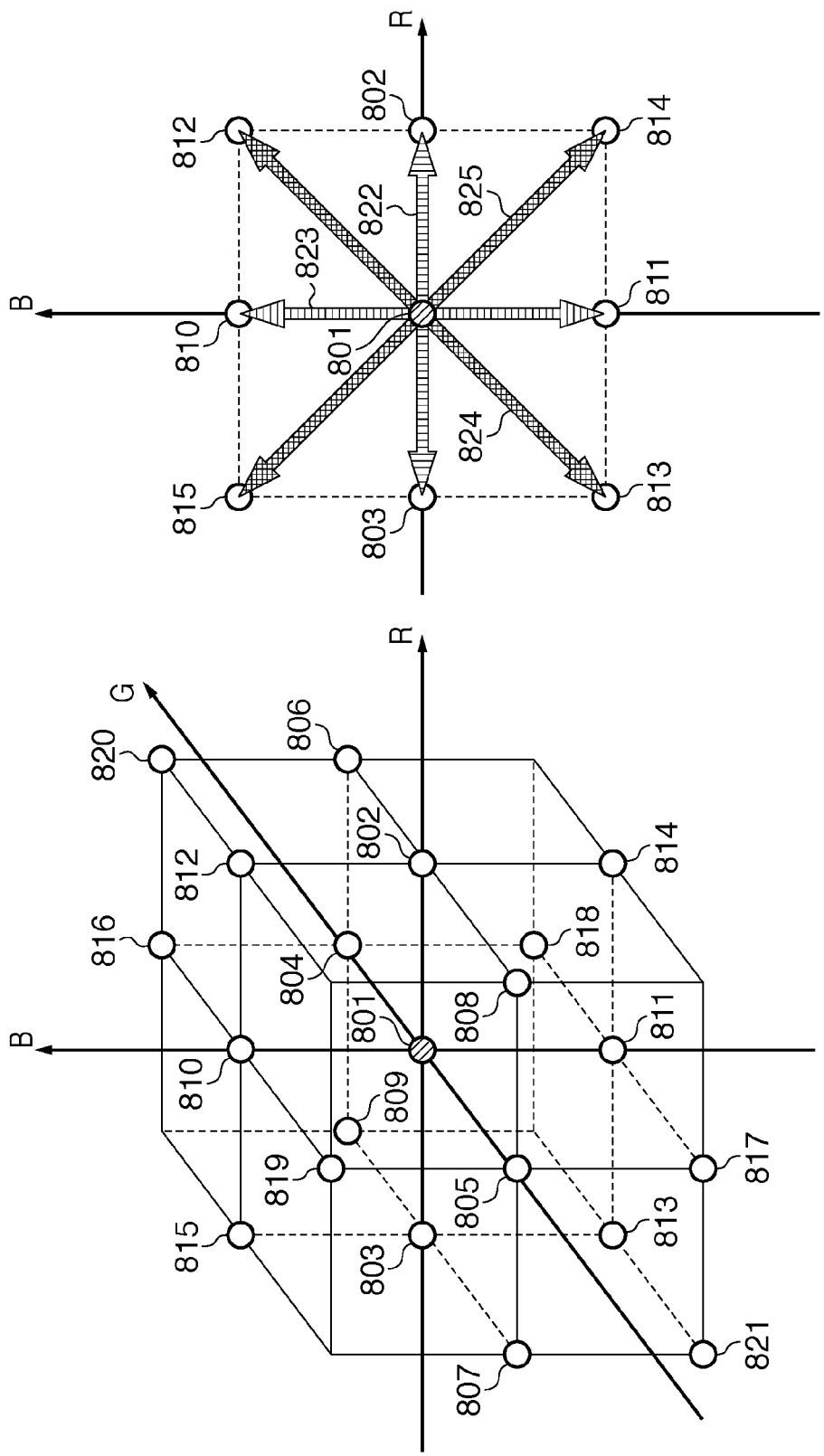
FIGS. 9A and 9B are views for explaining a grid point of interest, adjacent grid points, and evaluation directions.

A grid point of interest, adjacent grid points, and evaluation directions will be described below with reference to FIGS. 9A and 9B. FIG. 9A is an enlarged view around a grid point 801 of interest, and shows adjacent grid points by adding respective RGB values by ±32 to have the grid point 801 of interest as the center. In the calculation processing of the gradation evaluation value Egra (S801), the positional relationships between the output color of the grid point 801 and those of 20 adjacent grid points 802 to 821 shown in FIG. 9A in the CIELab space are evaluated. Note that the output colors (Lab values) are estimated by calculating tristimulus values XYZ from the spectral reflectances acquired in step S703, the spectral characteristics of a predetermined light source (for example, D50), and a color matching function of a CIEXYZ color system, and converting the XYZ values into Lab values.

FIG. 9B shows gradation evaluation directions, and shows an RB plane having the grid point 801 of interest as the center for the sake of simplicity. A line segment 822 couples the grid point 801 of interest, an adjacent grid point 802 in a +R direction, and an adjacent grid point 803 in a −R direction. A line segment 823 couples the grid point 801 of interest, an adjacent grid point 810 in a +B direction, and an adjacent grid point 811 in a −B direction. A line segment 824 couples the grid point 801 of interest, an adjacent grid point 812 in a +R+B direction, and an adjacent grid point 813 in a −R−B direction. A line segment 825 couples the grid point 801 of interest, an adjacent grid point 814 in a +R−B direction, and an adjacent grid point 815 in a −R+B direction. A gradation evaluation value Gd is calculated for each of these line segments, and a weighted sum of the evaluation values Gd of all the line segments is finally calculated as a gradation evaluation value Egra of the grid point 801 of interest. Note that the evaluation values Gd are calculated for the following 10 line segments.

+R direction: a line segment that passes through the grid points 802, 801, and 803;

+G direction: a line segment that passes through the grid points 804, 801, and 805;

+B direction: a line segment that passes through the grid points 810, 801, and 811;

+R+G direction: a line segment that passes through the grid points 806, 801, and 807;

+R−G direction: a line segment that passes through the grid points 808, 801, and 809;

+R+B direction: a line segment that passes through the grid points 812, 801, and 813;

+R−B direction: a line segment that passes through the grid points 814, 801, and 815;

+G+B direction: a line segment that passes through the grid points 816, 801, and 817;

+G−B direction: a line segment that passes through the grid points 818, 801, and 819; and +R+G+B direction (lightness direction): a line segment that passes through the grid points 820, 801, and 821.

Figure 10:
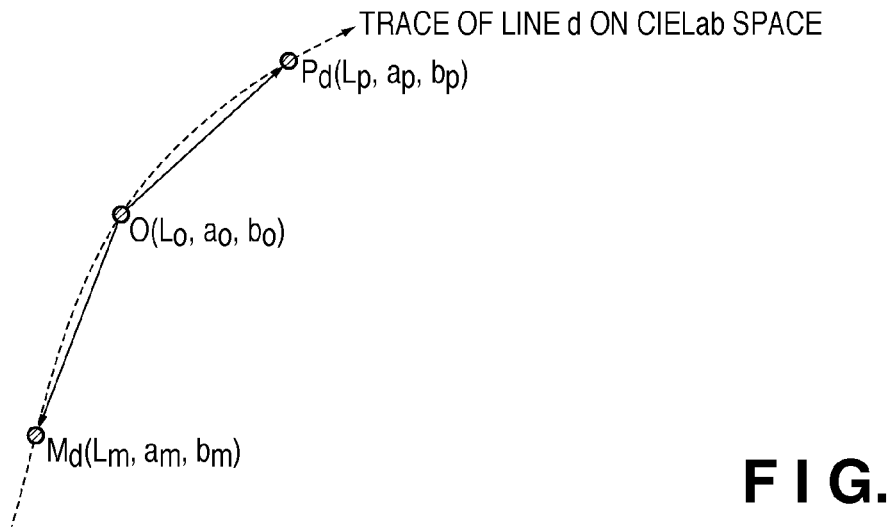
FIG. 10 is a view for explaining calculations of a gradation evaluation value.

The calculations of the gradation evaluation value Egra will be described below with reference to FIG. 10. FIG. 10 illustrates a state in which a line d corresponding to one of the aforementioned line segments is plotted in the CIELab space. A point O is a plot of the grid point 801 of interest, and has values (L*, a*, b*)=($L_o$, $a_o$, $b_o$) corresponding to the output color of the grid point of interest. Likewise, points Pd and Md are plots of adjacent grid points, and respectively have values (L*, a*, b*)=($L_p$, $a_p$, $b_p$) and (L*, a*, b*)=($L_m$, $a_m$, $b_m$). The gradation evaluation value Gd of the line d is calculated by:

$$Gd = (L_p + L_m - 2L_o)^2 / (L_p - L_m)^2 + \qquad (2)$$
$$(a_p + a_m - 2a_o)^2 / (a_p - a_m)^2 +$$
$$(b_p + b_m - 2b_o)^2 / (b_p - b_m)^2$$

As can be seen from equation (2), each evaluation value Gd becomes smaller as the points O, Pd, and Md are arranged linearly and the lengths of line segments O-Pd and O-Md are equal to each other. That is, when the output color (point O) of the grid point of interest is updated to reduce the evaluation value Gd, the output colors of respective grid points can be uniformly allocated in the CIELab space.

The gradation evaluation values Gd are calculated for the above 10 line segments, and the weighted sum of these evaluation values Gd is calculated as the gradation evaluation value Egra of the grid point of interest by:

$$Egra = \Sigma_d wd \cdot Gd \qquad (3)$$

where d is an index required to identify the line segment, and wd is a weighting coefficient according to each line segment.

Note that the direction to which the user attaches importance of those of the line segments can be adjusted by adjusting the weight wd in equation (3).

A weighting coefficient w10 associated with a line segment is changed according to $S_{hls}$ calculated from the position information (ri, gi, bi) of a grid point, as given by:

if(d=10)

$wd = q \cdot (1.0 - S_{hls})^p + r;$ else $wd = r;$ \qquad (4)

where $S_{hls}$=max(ri, gi, bi)−min(ri, gi, bi), and q, p, and r are constants.

Note that the index d=10 indicates the line segment in the R+G+B direction (lightness direction), as described above.

Figure 11:
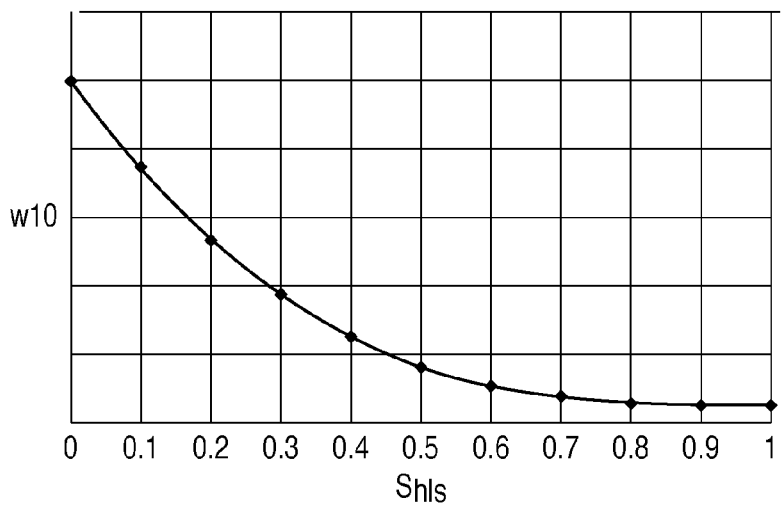
FIG. 11 is a graph for explaining an example of a weighting coefficient.

An example of the weighting coefficient wd will be described below with reference to FIG. 11. As the characteristics of the weighting coefficient w10 of d=10, which is calculated by equation (4), the weighting coefficient w10 becomes larger with decreasing $S_{hls}$, as shown in FIG. 11. That is, a weighting coefficient in the lightness direction becomes larger as a grid position is more adjacent to gray (ri=gi=bi). As a result, the evaluation value Gd becomes smaller (evaluation becomes better) as changes of colors in the a* and b* directions near gray are smaller.

Evaluation of Change of Amount of Color Material

Figure 12:
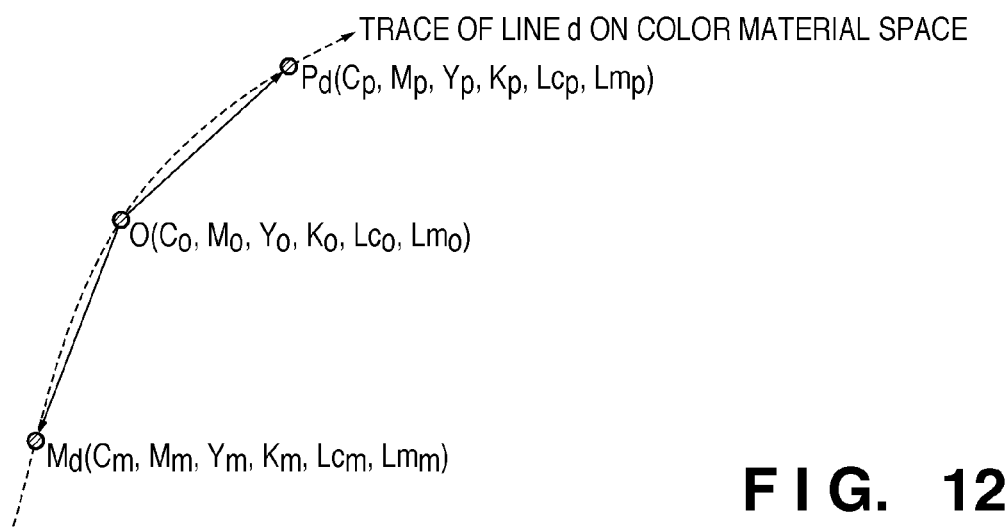
FIG. 12 is a view for explaining calculations of a color material change amount evaluation value.

Calculations of the color material change amount evaluation value Eink will be described below with reference to FIG. 12. The grid point of interest, adjacent grid points, and evaluation directions are the same as those in gradation evaluation. FIG. 12 illustrates a state in which a line d corresponding to one of the aforementioned line segments is plotted in the color material amount space. A point O is a plot of the grid point 801 of interest, and has a value (C, M, Y, K, Lc, Lm)=($C_o$, $M_o$, $Y_o$, $K_o$, $Lc_o$, $Lm_o$). Likewise, points Pd and Md are plots of adjacent grid points, and respectively have values ($C_p$, $M_p$, $Y_p$, $K_p$, $Lc_p$, $Lm_p$) and ($C_m$, $M_m$, $Y_m$, $K_m$, $Lc_m$, $Lm_m$). A color material amount change evaluation value Id of the line d is calculated by:

$$Id = (C_p + C_m - 2C_o)^2 / (C_p - C_m)^2 + \qquad (5)$$
$$(M_p + M_m - 2M_o)^2 / (M_p - M_m)^2 +$$
$$(Y_p + Y_m - 2Y_o)^2 / (Y_p - Y_m)^2 +$$
$$(Lc_p + Lc_m - 2Lc_o)^2 / (Lc_p - Lc_m)^2 +$$
$$(Lm_p + Lm_m - 2Lm_o)^2 / (Lm_p - Lm_m)^2$$

As can be seen from equation (5), each evaluation value Id becomes smaller as the points O, Pd, and Md are arranged linearly and the lengths of line segments O-Pd and O-Md are equal to each other. That is, when the output color (point O) of the grid point of interest is updated to reduce the evaluation value Id, the output colors of respective grid points can be uniformly allocated in the color material amount space.

The gradation evaluation values Id are calculated for the above 10 line segments, and the weighted sum of these evaluation values Id is calculated as the color material amount change evaluation value Eink of the grid point of interest by:

$$Eink = \Sigma_d wd \cdot Id \qquad (6)$$

Note that the direction to which the user attaches importance of those of the line segments can be adjusted by adjusting the weight wd in equation (6). Note that the same weight wd as in the gradation evaluation can be used.

Evaluation of Change of Amount of Light Source

In the evaluation of changes of amounts of light sources, an evaluation value required to suppress color appearance differences depending on light sources is calculated.

More specifically, tristimulus values XYZ are calculated from the spectral reflectances for amounts of color materials acquired in step S703, the spectral characteristics of a predetermined light source (for example, D50), and a color matching function of a CIEXYZ color system, and the XYZ values are converted into Lab(D50) values (estimation of Lab values). Next, the light source is changed to, for example, F10 (three-band type, sun light) as a typical fluorescent lamp. Then, tristimulus values XYZ are calculated from the spectral reflectances for amounts of color materials acquired in step S703, the spectral characteristics of F10, and a color matching function of a CIEXYZ color system, and the XYZ values are converted into Lab(F10) values (estimation of Lab values). Next, a color difference ΔE (CIE1976) between the Lab(D50) values and Lab(F10) values is calculated as the light source change amount evaluation value Ecii.

The example using D50 and F10 as the light sources has been described above. However, the present invention is not limited to these specific light sources. For example, combinations of arbitrary light sources such as that of an A light source and D50 light source and that of an F8 light source and F10 light source may be used. Also, Lab values under three or more different light sources may be respectively calculated, and their average color difference may be set as the evaluation value Ecii.

Weight in Total Evaluation

The weight Wink for the color material change amount evaluation value Eink is set by:

$$Wink(ri,gi,bi)=q1\cdot(1.0-L_{hls})^{p1}+r1 \qquad (7)$$

where $L_{hls}$=max(ri', gi', bi'), that is, lightness information of the grid point of interest, q1, p1, and r1 are constants, and ri', gi', and bi' are position information of the grid point of interest, that is, values within a range from 0 to 1 obtained by normalizing RGB values of the grid point of interest (to divide the RGB values by 255 in case of 8 bits per component).

Figure 13:
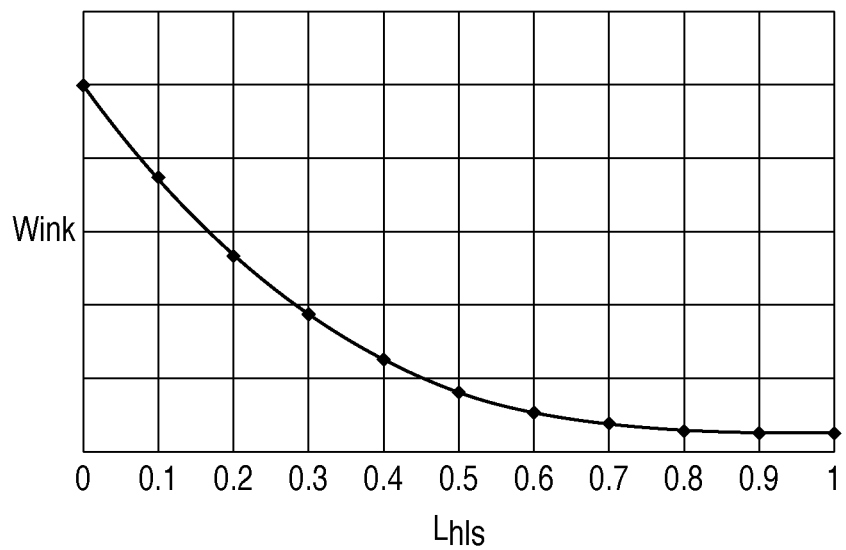
FIG. 13 is a graph showing the relationship between lightness information $L_{hls}$ and a weight Wink.

FIG. 13 shows the relationship between the lightness information $L_{hls}$ and weight Wink. As shown in FIG. 13, Wink increases with decreasing $L_{hls}$. In general, the color separation result of a low-lightness part includes color mixtures of various color materials. As a result, reproduced colors are approximate to black due to color mixtures, and the gamut is narrowed down. That is, only the evaluation (gradation evaluation) required to uniformly allocate output colors in the Lab space cause adverse effects such as generation of pseudo contours and heterogeneity of gloss since the continuity of output values (amounts of color materials) of grid points lowers in the low-lightness part to disturb smooth changes of amounts of color materials. By increasing the weight Wink of the color material change amount evaluation value Eink in the low-lightness part, the amounts of color materials in the low-lightness part change more smoothly, thus obtaining an image with higher image quality.

The weight Wcii for the light source change amount evaluation value Ecii is set by:

$$Wcii(ri,gi,bi)=q2\cdot(1.0-S_{hls})^{p2}+r2 \qquad (8)$$

where $S_{hls}$=max(ri', gi', bi')−min(ri', gi', bi'), that is, saturation information of the grid point of interest, and q2, p2, and r2 are constants.

Figure 14:
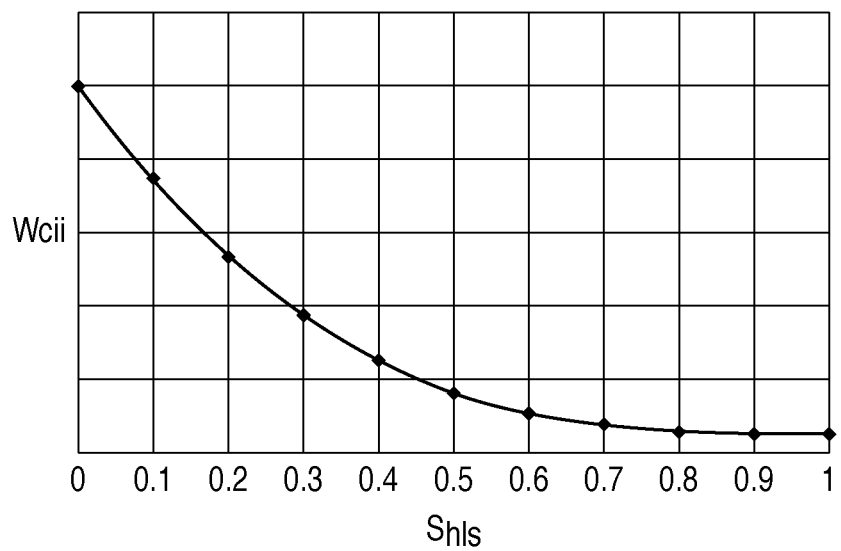
FIG. 14 is a graph showing the relationship between saturation information $S_{hls}$ and a weight Wcii.

FIG. 14 shows the relationship between the saturation information $S_{hls}$ and weight Wcii. As shown in FIG. 14, Wcii increases with decreasing $S_{hls}$. In general, color appearance differences due to light source differences are larger in a low-saturation part approximate to gray. By increasing the weight Wcii for the light source change amount evaluation value Ecii, a high-quality image which has smaller color appearance differences due to light source differences in low-saturation part approximate to gray can be obtained.

The weight Wgra for the gradation evaluation value Egra is set by:

$$Wgra(ri,gi,bi)=T-Wink(ri,gi,bi)-Wcii(ri,gi,bi);$$

$$If(Wgra(ri,gi,bi)<0)Wgra(ri,gi,bi)=0; \qquad (9)$$

where T is a constant.

The weight Wgra is decided depending on Wink and Wcii, and becomes larger when Wink and Wcii are smaller. The large weight Wgra is set for a high-lightness part and high-saturation part other than the low-lightness part in which the large weight Wink is set and the low-saturation part in which the large weight Wcii is set, thus deciding the output values of grid points so that output colors of the grid points are uniformly allocated in the Lab space.

As described above, the weights for the respective evaluation values are changed according to the positions (ri, gi, bi) of grid points, thus deciding the output values (amounts of color materials) of the grid points. A color separation profile which has a good balance in association with different degrees of importance of image quality depending on locations of the output gamut can be generated, thus obtaining a high-quality image.

Modification of Embodiments

The above embodiment has exemplified a six-color printer of CMYKLcLm, but the number of color materials is not limited. Printers using a larger number of color materials have complicated gamut shapes, and image deterioration such as a pseudo contour generally tends to occur. That is, the present invention is effective for generation of a color separation profile for a printer using a large number of color materials.

The evaluations of gradation and changes of amounts of light sources have been explained taking the CIELab space as a uniform color space as an example. However, for example, a Jab space of CIECAM97s may be used in these evaluations.

The above embodiment has exemplified the case in which the present invention is implemented as the AP 101 running on the computer 100. However, the present invention is not limited to this. For example, the present invention can also be implemented as a profile generation apparatus built in a printer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-275937, filed Dec. 3, 2009, which is hereby incorporated by reference herein in its entirety.

What is claimed is:

1. A color processing apparatus for generating a profile for color separation that indicates a relationship between input color values in an input color space and output signal values to be output to an image forming device, the apparatus comprising:

an estimator, configured to estimate a color value of an output color reproduced by an output signal value, wherein the output signal value is obtained by sampling a range of the output signal value and corresponds to an input color value of a grid point in the input color space;

a first calculator, configured to calculate a first evaluation value of change between a color value estimated to an input color value of a grid point of interest in the input color space by the estimator and color values estimated to input color values of grid points adjacent to the grid point of interest by the estimator;

a second calculator, configured to calculate a second evaluation value of change between an output signal value of the grid point of interest and output signal values of the adjacent grid points;

a third calculator, configured to calculate a third evaluation value of change between a plurality of color values estimated to the input color value of the grid point of interest in a plurality of illuminants, which are different, by the estimator;

a determiner, configured to determine whether or not a sum of the first to third evaluation values becomes less than a predetermined threshold value by changing the input color value of the grid point of interest; and a setting section, configured to set the output signal value, which reproduces the estimated color value of the grid point of interest, to the grid point of interest when the input color value of the grid point of interest that the sum becomes less than the predetermined threshold value is obtained.

2. A color processing apparatus for generating a profile for color separation that indicates a relationship between input values of input image signals and output values of image signals to be output to an image forming device, the apparatus comprising:

a generator, configured to generate an initial profile for the color separation which sets output values of other grid points in a color space from output values corresponding to representative grid points in the color space of the input image signals;

an estimator, configured to estimate output colors to be formed by the image forming device in correspondence with input values of grid points in the color space using the initial profile for color separation, and colorimetry results of color patches formed by the image forming device based on signal values obtained by sampling a range of the output values;

a first calculator, configured to calculate a first evaluation value that evaluates changes between the output color estimated in correspondence with an input value of a grid point of interest in the color space and output colors estimated in correspondence with input values of grid points adjacent to the grid point of interest;

a second calculator, configured to calculate a second evaluation value that evaluates changes between the output value of the grid point of interest and the output values of the adjacent grid points;

a third calculator, configured to calculate a third evaluation value that evaluates changes between a plurality of output values estimated in correspondence with input values to the grid point of interest in association with a plurality of different light sources;

a repetition section, configured to change an input value of the grid point of interest until a sum of the first to third evaluation values becomes less than a predetermined threshold, and to control the estimator to repeat the prediction of the output color based on the changed input value, and the first to third calculators to repeat the calculations of the first to third evaluation values; and an updater, configured to update, when the input value of the grid point of interest, whose the sum becomes less than the predetermined threshold, is obtained, the output value of the grid point of interest by an output value corresponding to the input value calculated using the initial profile for the color separation.

3. The apparatus according to claim 2, wherein the repetition section calculates the sum of the evaluation values by increasing a weight for the output value evaluation value when the grid point of interest is located in a low-lightness part.

4. The apparatus according to claim 2, wherein the repetition section calculates the sum of the evaluation values by increasing a weight for the output color evaluation value when the grid point of interest is located in a high-lightness part.

5. The apparatus according to claim 2, wherein the repetition section calculates the sum of the evaluation values by increasing a weight for the light source change evaluation value when the grid point of interest is located in a low-saturation part.

6. The apparatus according to claim 2, wherein the first calculator calculates the evaluation value while attaching importance to gradation in a lightness direction when the grid point of interest is located in a low-saturation part.

7. The apparatus according to claim 2, further comprising a storing section configured to store a relationship between input values and output values of respective grid points as the color separation profile in a memory after the updater updates the output values of all grid points in the color space.

8. A method of generating a profile for color separation that indicates a relationship between input color values in an input color space and output signal values to be output to an image forming device, the method comprising:

using a processor to perform the steps of:

estimating a color value of an output color reproduced by an output signal value, wherein the output signal value is obtained by sampling a range of the output signal value and corresponds to an input color value of a grid point in the input color space;

calculating a first evaluation value of change between a color value estimated to an input color value of a grid point of interest in the input color space by the estimator and color values estimated to input color values of grid points adjacent to the grid point of interest by the estimator;

calculating a second evaluation value of change between an output signal value of the grid point of interest and output signal values of the adjacent grid points;

calculating a third evaluation value of change between a plurality of color values estimated to the input color value of the grid point of interest in a plurality of illuminants, which are different, in the estimating step;

determining whether or not a sum of the first to third evaluation values becomes less than a predetermined threshold value by changing the input color value of the grid point of interest; and setting the output signal value, which reproduces the estimated color value of the grid point of interest, to the grid point of interest when the input color value of the grid point of interest that the sum becomes less than the predetermined threshold value is obtained.

9. A non-transitory computer readable medium storing a computer-executable program for causing a computer to perform a method of generating a profile for color separation that indicates a relationship between input color values in an input color space and output signal values to be output to an image forming device, the method comprising the steps of:

estimating a color value of an output color reproduced by an output signal value, wherein the output signal value is obtained by sampling a range of the output signal value and corresponds to an input color value of a grid point in the input color space;

calculating a first evaluation value of change between a color value estimated to an input color value of a grid point of interest in the input color space by the estimator and color values estimated to input color values of grid points adjacent to the grid point of interest by the estimator;

calculating a second evaluation value of change between an output signal value of the grid point of interest and output signal values of the adjacent grid points;

calculating a third evaluation value of change between a plurality of color values estimated to the input color value of the grid point of interest in a plurality of illuminants, which are different, in the estimating step;

determining whether or not a sum of the first to third evaluation values becomes less than a predetermined threshold value by changing the input color value of the grid point of interest; and setting the output signal value, which reproduces the estimated color value of the grid point of interest, to the grid point of interest when the input color value of the grid point of interest that the sum becomes less than the predetermined threshold value is obtained.

10. A method of generating a profile for color separation that indicates a relationship between input values of input image signals and output values of image signals to be output to an image forming device, the method comprising:

using a processor to perform the steps of:

generating an initial profile for the color separation which sets output values of other grid points in a color space from output values corresponding to representative grid points in the color space of the input image signals;

estimating output colors to be formed by the image forming device in correspondence with input values of grid points in the color space using the initial profile for color separation, and colorimetry results of color patches formed by the image forming device based on signal values obtained by sampling a range of the output values;

calculating a first evaluation value that evaluates changes between the output color estimated in correspondence with an input value of a grid point of interest in the color space and output colors estimated in correspondence with input values of grid points adjacent to the grid point of interest;

calculating a second evaluation value that evaluates changes between the output value of the grid point of interest and the output values of the adjacent grid points;

calculating a third evaluation value that evaluates changes between a plurality of output values estimated in correspondence with input values to the grid point of interest in association with a plurality of different light sources;

repeating, by changing an input value of the grid point of interest until a sum of the first to third evaluation values becomes less than a predetermined threshold, the prediction of the output color based on the changed input value in the estimating step and the calculations of the first to third evaluation values in the first to third calculating steps; and updating, when the input value of the grid point of interest, whose the sum becomes less than the predetermined threshold, is obtained, the output value of the grid point of interest by an output value corresponding to the input value calculated using the initial profile for the color separation.

11. A non-transitory computer readable medium storing a computer-executable program for causing a computer to perform a method of generating a profile for color separation that indicates a relationship between input color values in an input color space and output signal values to be output to an image forming device, the method comprising the steps of:

generating an initial profile for the color separation which sets output values of other grid points in a color space from output values corresponding to representative grid points in the color space of the input image signals;

estimating output colors to be formed by the image forming device in correspondence with input values of grid points in the color space using the initial profile for color separation, and colorimetry results of color patches formed by the image forming device based on signal values obtained by sampling a range of the output values;

calculating a first evaluation value that evaluates changes between the output color estimated in correspondence with an input value of a grid point of interest in the color space and output colors estimated in correspondence with input values of grid points adjacent to the grid point of interest;

calculating a second evaluation value that evaluates changes between the output value of the grid point of interest and the output values of the adjacent grid points;

calculating a third evaluation value that evaluates changes between a plurality of output values estimated in correspondence with input values to the grid point of interest in association with a plurality of different light sources;

repeating, by changing an input value of the grid point of interest until a sum of the first to third evaluation values becomes less than a predetermined threshold, the prediction of the output color based on the changed input value in the estimating step and the calculations of the first to third evaluation values in the first to third calculating steps; and updating, when the input value of the grid point of interest, whose the sum becomes less than the predetermined threshold, is obtained, the output value of the grid point of interest by an output value corresponding to the input value calculated using the initial profile for the color separation.

* * * * *